(12) United States Patent
Izutsu et al.

(10) Patent No.: US 7,775,921 B2
(45) Date of Patent: Aug. 17, 2010

(54) CHAIN TENSIONER

(75) Inventors: Tomoyoshi Izutsu, Shizuoka (JP); Seiji Sato, Shizuoka (JP); Hisashi Hayakawa, Shizuoka (JP)

(73) Assignee: NTN Corporation, Osaka (JP)

( * ) Notice: Subject to any disclaimer, the term of this patent is extended or adjusted under 35 U.S.C. 154(b) by 724 days.

(21) Appl. No.: 10/494,019

(22) PCT Filed: Nov. 1, 2002

(86) PCT No.: PCT/JP02/11480

§ 371 (c)(1),
(2), (4) Date: Apr. 29, 2004

(87) PCT Pub. No.: WO03/038306

PCT Pub. Date: May 8, 2003

(65) Prior Publication Data

US 2004/0266571 A1 Dec. 30, 2004

(30) Foreign Application Priority Data

Nov. 2, 2001 (JP) .............................. 2001-337332
Oct. 25, 2002 (JP) .............................. 2002-311035

(51) Int. Cl.
*F16H 7/22* (2006.01)
(52) U.S. Cl. .................... 474/110; 474/109; 474/111
(58) Field of Classification Search ......... 474/109–110, 474/134–138, 101, 117–118, 133; 137/15.2, 137/510; 29/888.44, 603.12, 557; 72/233–236, 72/348
See application file for complete search history.

(56) References Cited

U.S. PATENT DOCUMENTS

| 3,812,733 | A | * | 5/1974 | Yoshida | 474/111 |
| 4,070,895 | A | * | 1/1978 | Yamada et al. | 29/888.44 |
| 4,366,995 | A | * | 1/1983 | Kocian | 384/536 |
| 4,466,802 | A | * | 8/1984 | Ojima et al. | 474/138 |
| 4,472,162 | A | * | 9/1984 | Hitchcock | 474/117 |
| 4,539,001 | A | * | 9/1985 | Okabe | 474/138 |
| 4,632,269 | A | * | 12/1986 | Rose | 220/3.8 |
| 4,950,207 | A | * | 8/1990 | Henderson | 474/133 |
| 5,213,126 | A | * | 5/1993 | Ono et al. | 137/15.22 |

(Continued)

FOREIGN PATENT DOCUMENTS

CN    1164729    11/1997

(Continued)

OTHER PUBLICATIONS

Japanese Notice of Grounds of Rejection (with English translation) issued May 15, 2008 in JP 2002-311035, which is a foreign counterpart to the present application.

*Primary Examiner*—Marcus Charles
(74) *Attorney, Agent, or Firm*—Wenderoth, Lind & Ponack, LLP.

(57) ABSTRACT

A plunger 4 and a spring 6 biasing the plunger 4 outwardly are mounted in a cylinder chamber 2 formed in a housing 1. The housing 1 is provided with an oil supply passage 8 communicating with a pressure chamber 7 formed in the back of the plunger 4. The housing 1 has an outer diameter that is substantially constant over the entire axial length, so that such housings can be mass-produced by pressing. It is thus possible to lower the cost of the chain tensioner.

18 Claims, 10 Drawing Sheets

U.S. PATENT DOCUMENTS

| | | | |
|---|---|---|---|
| 5,266,067 A * | 11/1993 | Gapco | 474/112 |
| 5,310,385 A | 5/1994 | Suzuki | |
| 5,480,358 A * | 1/1996 | Sakai et al. | 474/117 |
| 5,547,429 A * | 8/1996 | Hirabayashi et al. | 474/110 |
| 5,571,061 A * | 11/1996 | Tsai et al. | 474/135 |
| 5,632,474 A * | 5/1997 | Hayakawa et al. | 267/226 |
| 5,632,698 A * | 5/1997 | Suzuki | 474/110 |
| 5,649,878 A * | 7/1997 | Noguchi et al. | 474/110 |
| 5,658,212 A | 8/1997 | Meurer et al. | |
| 5,700,213 A * | 12/1997 | Simpson et al. | 474/110 |
| 5,704,860 A * | 1/1998 | Stief | 474/110 |
| 5,707,309 A * | 1/1998 | Simpson | 474/110 |
| 5,713,809 A * | 2/1998 | Yamamoto et al. | 474/110 |
| 5,833,220 A * | 11/1998 | Nakakubo et al. | 267/226 |
| 5,879,255 A * | 3/1999 | Yamamoto et al. | 474/110 |
| 5,913,742 A * | 6/1999 | Nakamura et al. | 474/110 |
| 5,924,188 A | 7/1999 | Tokunou et al. | |
| 5,931,754 A | 8/1999 | Stief et al. | |
| 5,989,139 A * | 11/1999 | Dusinberre et al. | 474/110 |
| 6,086,497 A * | 7/2000 | Fukuda et al. | 474/110 |
| 6,139,454 A * | 10/2000 | Simpson | 474/110 |
| 6,193,623 B1 * | 2/2001 | Koch et al. | 474/110 |
| 6,322,468 B1 * | 11/2001 | Wing et al. | 474/110 |
| 6,361,458 B1 * | 3/2002 | Smith | 474/109 |
| 6,412,464 B1 * | 7/2002 | Schneider et al. | 123/90.31 |
| 6,435,992 B2 * | 8/2002 | Wakabayashi et al. | 474/101 |
| 6,447,415 B1 * | 9/2002 | Hashimoto et al. | 474/110 |
| 6,666,784 B1 * | 12/2003 | Iwamoto et al. | 474/109 |
| 6,685,587 B2 * | 2/2004 | Rossato et al. | 474/109 |
| 6,817,958 B2 * | 11/2004 | Kaido et al. | 474/101 |
| 6,849,012 B2 * | 2/2005 | Poiret et al. | 474/110 |
| 2001/0044352 A1 * | 11/2001 | Korenjak et al. | 474/101 |
| 2003/0008738 A1 * | 1/2003 | Rossato et al. | 474/110 |

FOREIGN PATENT DOCUMENTS

| | | | | |
|---|---|---|---|---|
| DE | 1650620 | | 1/1970 | |
| EP | 0989332 A2 * | | 3/2000 | |
| EP | 1101975 A2 * | | 5/2001 | |
| GB | 2262582 A * | | 6/1993 | |
| JP | 54-115467 | | 9/1979 | |
| JP | 06-205994 A * | | 7/1994 | 99/617 |
| JP | 7-27191 | | 1/1995 | |
| JP | 8-4860 | | 1/1996 | |
| JP | 9-280330 | | 10/1997 | |
| JP | 10009309 A * | | 1/1998 | |
| JP | 10-30695 | | 2/1998 | |
| JP | 2003-337461 | | 12/2000 | |
| JP | 2001-124159 | | 5/2001 | |
| JP | 2001-146946 | | 5/2001 | |
| JP | 3243226 | | 10/2001 | |

* cited by examiner

Fig. 13 - PRIOR ART
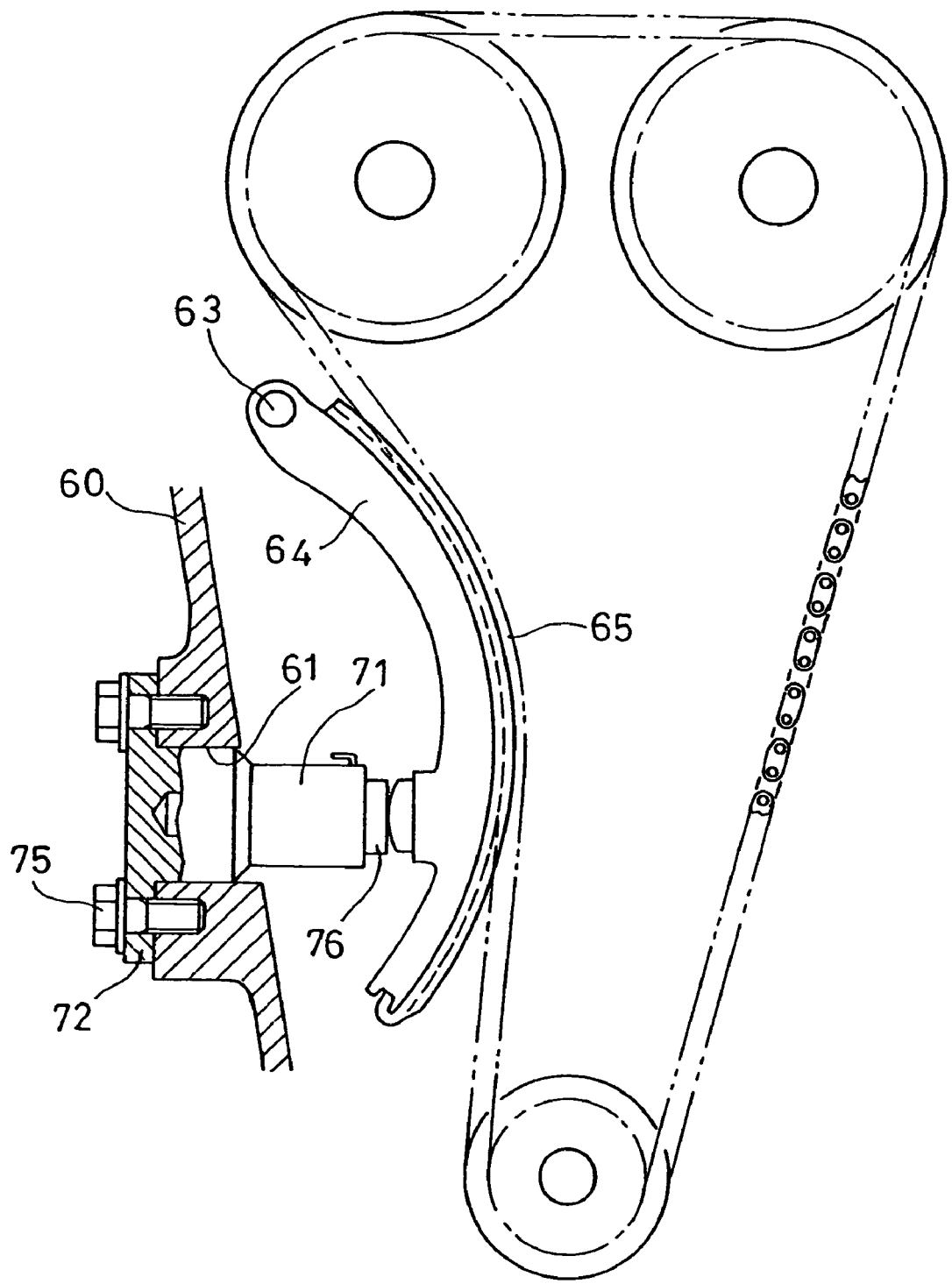

Fig. 14 - PRIOR ART
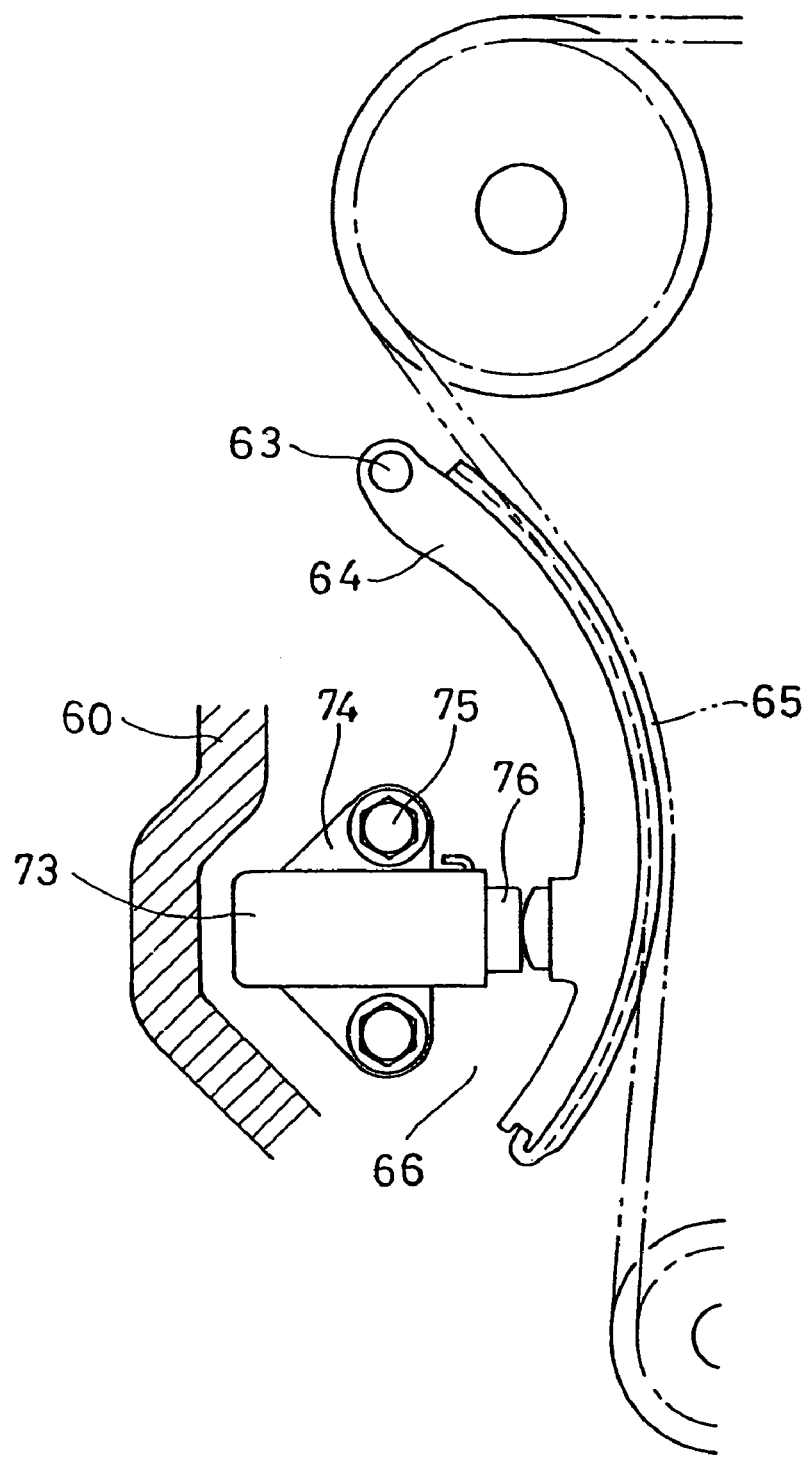

CHAIN TENSIONER

TECHNICAL FIELD TO WHICH THE INVENTION BELONGS

This invention relates to a chain tensioner for keeping constant the tension of a chain of a chain transmission device, particularly a chain transmission device for driving a camshaft.

PRIOR ART

As such a chain tensioner, there is known one in which a plunger and a spring for biasing the plunger outwardly are mounted in a cylinder chamber formed in a housing, and an oil supply passage is formed in the housing to communicate with a pressure chamber formed in the back of the plunger, thereby damping the push-in force imparted to the plunger by hydraulic oil supplied to the pressure chamber through the oil supply passage.

Among chain tensioners having such a structure, there are an exterior type and an interior type (U.S. Pat. No. 5,658,212 and JP Patent No. 3243226).

In a chain tensioner of the former type, as shown in FIG. 13, a housing 71 of the chain tensioner is inserted into a mounting hole 61 formed in an engine cover 60, and a flange 72 provided at the rear end of the housing 71 is fixed to the engine cover 60 by tightening bolts 75.

On the other hand, in a chain tensioner of the latter type, as shown in FIG. 14, a plurality of mounting pieces 74 are formed on the outer periphery of a housing 73, and they are fixed to an engine block 66 by tightening bolts 75.

In both types of chain tensioners, a camshaft-driving chain 65 is tensioned by biasing a chain guide 64 pivotable about a shaft 63 by means of a plunger 76.

PROBLEMS THE INVENTION INTENDS TO SOLVE

In both types of chain tensioners, since it is fixed to the engine cover 60 or engine block 66 by tightening the bolts 75, it is necessary to provide the flange 72 or the mounting pieces 74 on the housing 71 or 73. Thus, the shape of the outer periphery of the housing 71 or 73 becomes complicated. This makes it impossible to employ pressing for mass-production of the housings 71, 73. Thus, the method is limited to diecasting or forging, so that the manufacturing cost increases. An object of this invention is to lower the cost of a chain tensioner.

MEANS TO SOLVE THE PROBLEMS

According to this invention, there is provided a chain tensioner comprising a housing formed with a cylinder chamber, a plunger slidably mounted in the cylinder chamber, a spring mounted in the cylinder chamber for biasing the plunger outwardly, the housing having an oil supply passage communicating with a pressure chamber formed at the back of the plunger, whereby damping a push-in force imparted to the plunger by hydraulic oil supplied to the pressure chamber through the oil supply passage, characterized in that the housing is cylindrical and has an outer diameter substantially uniform over the entire axial length thereof, and the housing is mounted by inserting it in a mounting hole formed in a member to which the chain tensioner is to be mounted.

By making the outer diameter of the housing substantially uniform over its entire axial length, such housings can be mass-produced by pressing. This reduces the cost of the housing. By forming a valve seat of the check valve for preventing reverse flow of hydraulic oil, integrally with the housing by pressing, it is possible to further reduce the cost.

In press-forming the housing, a blank is formed by punching a metal plate and the blank is deep-drawn. If the thickness of the blank is less than 1.7 mm, the strength of the housing would be insufficient. If it exceeds 2.5 mm, deep drawing would be difficult and the number of steps of drawing increase. This increases the manufacturing cost. Thus, the thickness of the blank is preferably 1.7-2.5 mm.

If the surface roughness Ra of the inner periphery of a cylinder chamber of the housing formed by pressing exceeds 3.2 μm, it tends to be worn due to contact with the plunger. Thus, the surface roughness Ra of the inner periphery is preferably not more than 3.2 μm.

In the chain tensioner according to this invention, by providing a check valve having a valve seat and a check ball provided so as to come into and out of contact with the valve seat and adapted to close the oil supply passage at the oil outlet of the oil supply passage, when push-in force is imparted to the plunger, the check valve will close the oil supply passage, thereby preventing hydraulic oil in the pressure chamber from flowing toward the oil supply passage. Thus the push-in force is damped by the hydraulic fluid in the pressure chamber. Thus, it is possible to provide a chain tensioner that is superior in the damper effect.

By integrally forming the valve seat with the housing, no seat member is necessary, so that it is possible to further reduce the manufacturing cost of a chain tensioner with a check valve, and to achieve compactness of the chain tensioner.

If the oil supply passage is a through hole axially extending through the end wall of the housing, an oil passage communicating with the oil supply passage is provided at the closed end of the mounting hole. In this case, under pressure of hydraulic oil supplied to the oil passage and due to a difference in area between the outer surface and the inner surface of the end wall of the cylinder chamber, the housing may move in such a direction as to come out of the mounting hole and conversely the plunger may be pushed too much toward the bottom of the cylinder chamber. If the moving amount of the housing, i.e. the push-in amount of the plunger is large, the housing may fall out of the mounting hole.

In order to prevent such trouble, according to this invention, a retraction restricting means is provided to prevent the plunger form being pushed in over a predetermined amount.

The retraction restricting means may comprise a clip-receiving groove in the inner periphery of the cylinder chamber near its opening, a register clip having a diametrically deformable ring portion received in the clip-receiving groove, the plunger being formed with a plurality of circumferential grooves in the outer periphery thereof at axial intervals, the each circumferential groove having a tapered surface which expands the ring portion when the plunger is advancing and an engaging surface which engages the ring portion to prevent retraction of the plunger.

Also, as the means for restricting the retraction of the plunger, one may be employed in which female threads formed on the inner periphery of the cylinder chamber at its opening end, and male threads formed on the outer periphery of the plunger and in threaded engagement with the female threads, the female threads and male threads having is serration-shaped such that pressure flanks thereof, which receive axial push-in force imparted to the plunger, have a greater flank angle than clearance flanks thereof, the serration-shaped threads having such a lead angle that the plunger moves outwardly under the elastic force of the spring.

In the chain tensioner provided with such a retraction restricting means, by making the retracting amount of the plunger restricted by the retraction restricting means smaller than the depth of the mounting hole, it is possible to prevent the chain tensioner from coming out of the mounting hole.

With a chain tensioner in which retraction of the plunger is restricted by the thread engagement of female threads with male threads, when the plunger axially moves while rotating, if the housing turns together with the plunger, the chain tensioner cannot exhibit its function. In order to prevent such trouble, a turn-preventive mechanism for preventing the housing from turning in the mounting hole may be provided.

Also, in the chain tensioner provided with a retraction restricting means, during movement of the housing, the housing is subject to wear due to contact with the inner periphery of the mounting hole. The inner periphery of the housing, too, is subject to wear due to the sliding of the plunger. In order to suppress such wear, the outer peripheral surface of the housing may be subjected to hardening.

For hardening, carburizing/nitriding or plating can be employed.

BRIEF DESCRIPTION OF DRAWINGS

FIG. 13 is a partially cutaway front view showing how a conventional chain tensioner is assembled.

FIG. 14 is a partially cutaway front view showing another example of assembling of a conventional chain tensioner.

DETAILED DESCRIPTION OF THE INVENTION

Figure 1A:
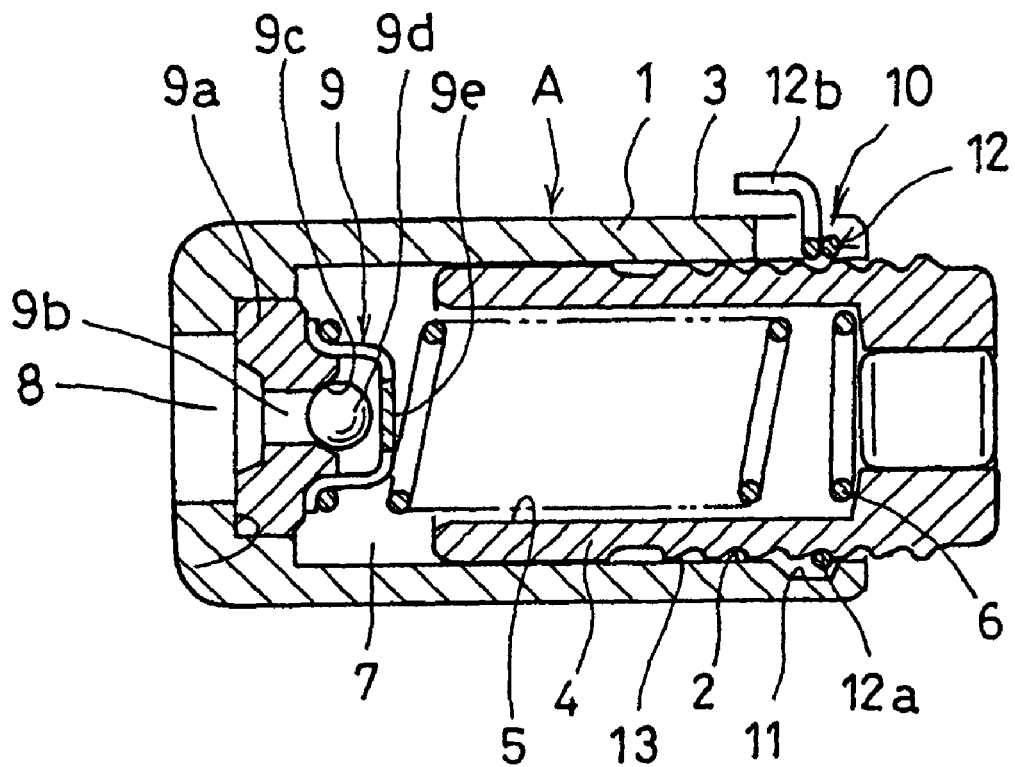
FIG. 1A is a longitudinal sectional front view showing a first embodiment of the chain tensioner according to this invention.
Figure 1B:
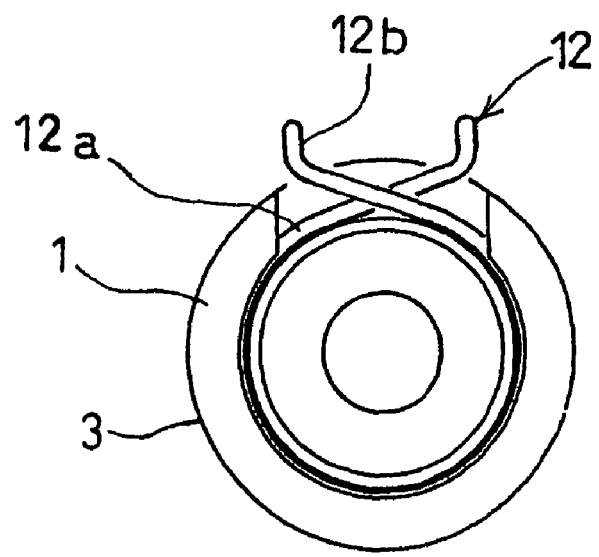
FIG. 1B is a right side view of FIG. 1A.

Hereinbelow, the embodiments of this invention will be described with reference to FIGS. 1A-12. FIGS. 1A and 1B show the first embodiment of the chain tensioner A according to this invention. As shown, in a housing 1, a cylinder chamber 2 having a closed bottom is formed. The outer periphery of the housing 1 is a cylindrical surface 3 having an outer diameter that is uniform over the entire axial length. The housing 1 is formed by pressing.

In pressing the housing 1, a blank is formed by blanking a metallic plate, and the blank is deep-drawn. The thickness of the blank is preferably about 1.7-2.5 mm. If it is less than 1.7 mm, it is impossible to obtain a housing 1 which is high in strength. If it exceeds 2.5 mm, steps of deep-drawing will increase, thus increasing the manufacturing cost. The housing 1 after pressing has the inner periphery of the cylinder chamber 2 ground to finish the surface roughness Ra of the inner diameter surface to 3.2 micrometers or under.

In the cylinder chamber 2, a plunger 4 is mounted. A spring-receiving hole 5 opening at the rear end is formed in the plunger 4. A spring 6 mounted between the closed end of the spring-receiving hole 5 and the bottom face of the cylinder chamber 2 biases the plunger 4 outwardly.

An oil supply passage 8 communicating with a pressure chamber 7 formed in the back of the plunger 4 is formed in the end wall of the cylinder chamber 2. At the oil outlet of the oil supply passage 8, a check valve 9 is provided to prevent reverse flow of hydraulic oil in the pressure chamber 7 toward the oil supply passage 8.

The check valve 9 comprises a seat member 9a mounted on the closed end wall of the cylinder chamber 2, a check ball 9d movable into and out of contact with a valve seat 9c of valve hole 9b formed in the seat member 9a for closing the valve hole 9b when brought into contact, and a retainer 9e for restricting the degree of opening of the check ball 9d.

Between the housing 1 and the plunger 4, there is provided a retracting movement restricting mechanism 10 for preventing the plunger 4 from retracting over a predetermined amount toward the bottom face of the cylinder chamber 2.

Figure 2A:
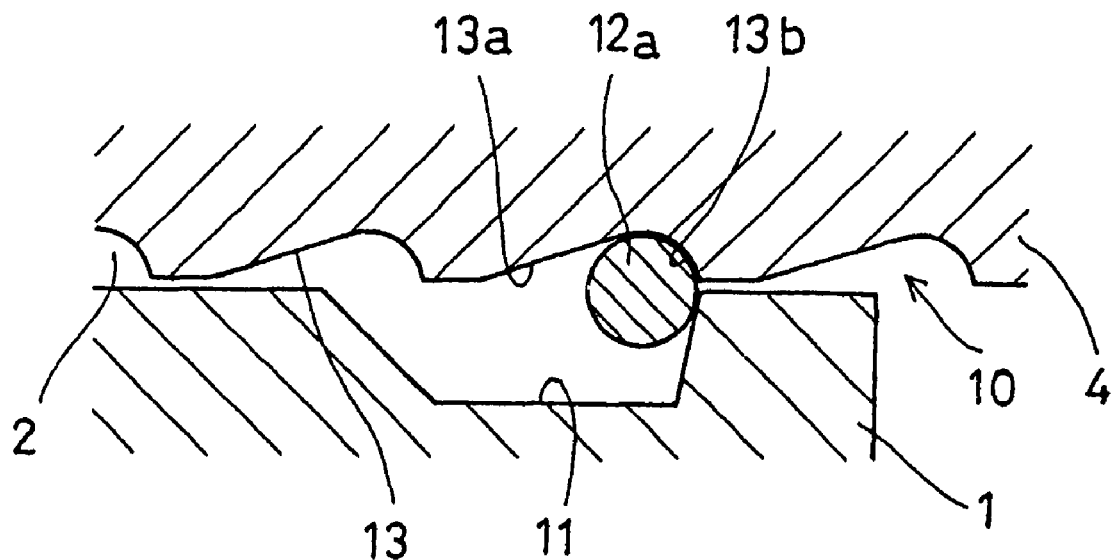
FIG. 2A is an enlarged sectional view of a portion of a retraction restricting mechanism of FIG. 1A.
Figure 2B:
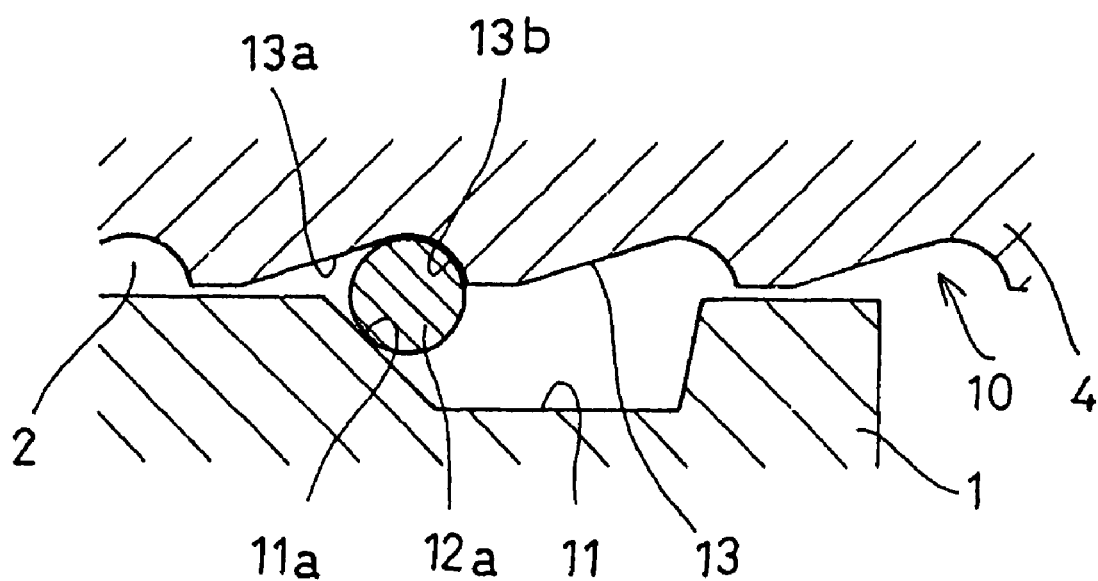
FIG. 2B is a sectional view showing a state in which retraction of the plunger is restricted.

As shown in FIGS. 2A and 2B, as the retraction restricting mechanism 10, a clip-receiving groove 11 is formed in the inner periphery of the opening of the cylinder chamber 2, a diametrically elastically deformable ring portion 12a, which is provided on a register clip 12, is received in the clip-receiving groove 11, a plurality of circumferential grooves 13 which are tightened by the ring portion are formed in the outer periphery of the plunger 4 at equal intervals in the axial direction, and a tapered surface 13a of which the diameter decreases toward the tip of the plunger 4, and an engaging surface 13b on the small-diameter side of the tapered surface 13a are provided on the inner periphery of each circumferential groove 13.

In the retraction restricting mechanism 10 having such a structure, due to the action of the tapered surfaces 13a increasing the diameter of the ring portion 12a, the plunger 4 is allowed to advance, and retraction of the plunger 4 is restricted by the engagement of the engaging surface 13b with the ring portion 12a of the register clip 12, which stops by abutting a rear end wall 11a of the clip-receiving groove 11.

In the chain tensioner shown in the first embodiment, as the register clip 12, a register clip was shown in which a pair of knobs 12b (see FIG. 1B) are provided on the ring portion 12a, and the pair of knobs 12b are biased inwardly so that the diameter of the ring portion 12a can be increased. But as with the chain tensioner A shown in the second embodiment of FIG. 4, a register clip 12 may be employed which has no knobs 12b and is elastically deformable in the diametric direction.

Figure 3:
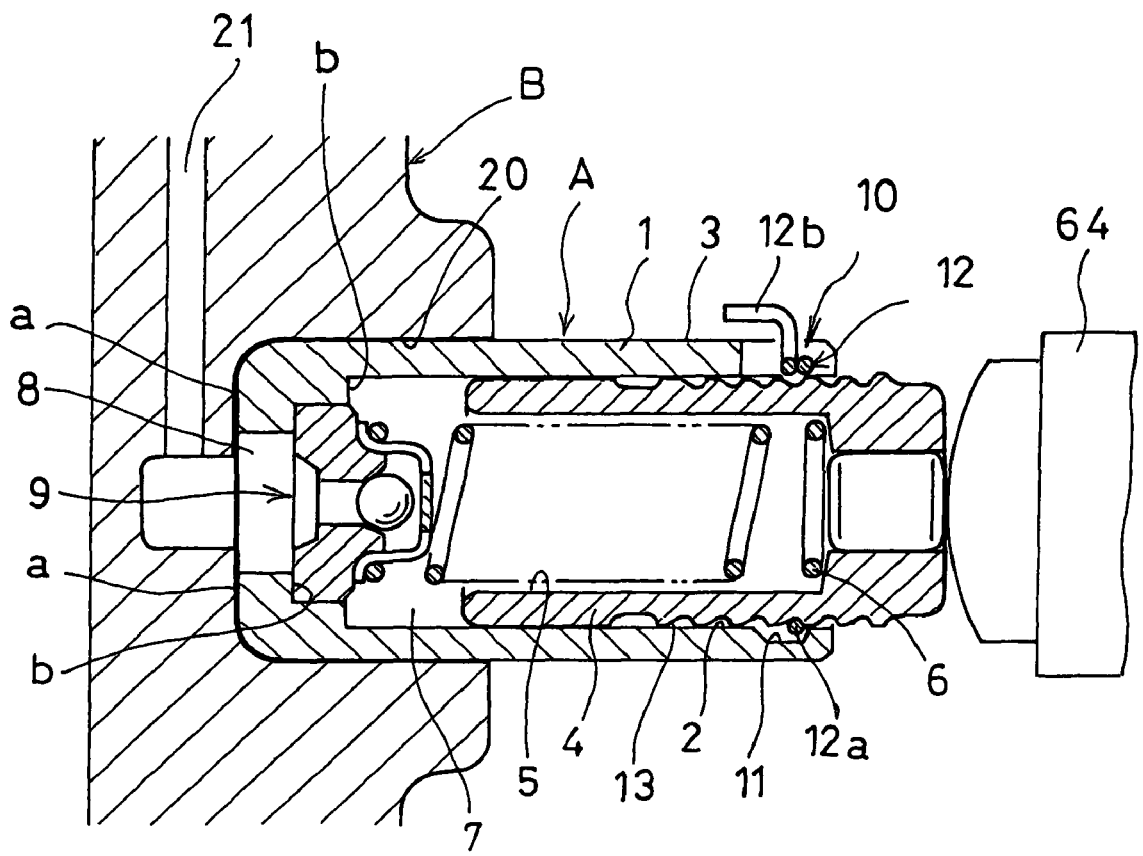
FIG. 3 is a longitudinal sectional front view showing an example of mounting of the chain tensioner shown in FIGS. 1A and 1B.

FIG. 3 shows the chain tensioner A having such a structure and mounted to an object B. As the tensioner mounting object B shown in FIG. 3, an engine cover shown in FIG. 13. In mounting the chain tensioner A, a mounting hole 20 having a closed end is formed in the object B, and the housing 1 of the chain tensioner A is fitted in the mounting hole 20. In the object B, an oil passage 21 communicating with the oil supply passage 8 of the chain tensioner A is formed.

In a tension adjusting state in which hydraulic oil is supplied through the oil passage 21 into the oil supply passage 8 and the plunger 4 biased outwardly by the spring 6 biases the chain guide 64 shown in FIG. 13, when, due to change in angular velocity during each rotation of the crankshaft or variation in torque of the camshafts, the chain 65 vibrates and slackening develops in the chain 65, the plunger 4 will move outwardly under the resilience of the spring 6 to absorb slackening of the chain 65.

At this time, the tapered surfaces 13a expand the diameter of the ring portion 12a of the register clip 12, thereby allowing advancement of the plunger 4 (see FIGS. 2A and 2B).

On the other hand, when the chain 65 is stretched, push-in force is imparted to the plunger 4 through the chain guide 64. The push-in force is damped by the hydraulic oil in the pressure chamber 7. If the push-in force is larger than the resilience of the spring 6, as shown in FIG. 2B, due to the engagement of the engaging surface 13b with the ring portion 12a of the register clip 12, which stops by abutting the rear wall surface 11a of the clip-receiving groove 11, retraction of the plunger 4 is restricted.

In the chain tensioner A shown in FIGS. 1A and 1B, since the outer diameter of the housing 1 is uniform over the entire axial length, such housings 1 can be mass-produced by pressing. Thus, the manufacturing cost of the housing 1 is low, so that it is possible to reduce the cost of the chain tensioner A.

Also, since the chain tensioner A is mounted by inserting the rear end of the housing 1 in the mounting hole formed in the object B, compared with conventional chain tensioners in which the housing is fixed by tightening bolts, mounting of the chain tensioner A is easier. Further, there is no need to provide a large space to mount the chain tensioner A, so it is possible to increase the freedom of design.

The chain tensioner A as shown in FIG. 3 is mounted by simply inserting the rear end of the housing 1 into the mounting hole formed in the object B, and there is a difference in area between the outer surface a and the inner surface b of the closed end wall of the cylinder chamber 2 in the housing 1. Thus, there is a fear that the housing 1 may be pushed outwardly under the pressure of hydraulic oil supplied to the oil passage 21 and conversely the plunger 4 is pushed into the housing 1.

At this time, as shown in FIG. 2B, the plunger 4 retracts to a position where the ring portion 12a of the register clip 12 abuts the rear wall surface 11a of the clip-receiving groove 11, and stops when the ring portion 12a abuts the rear wall surface 11a. Thus, the plunger 4 will not be pushed in more than necessary.

Figure 4:
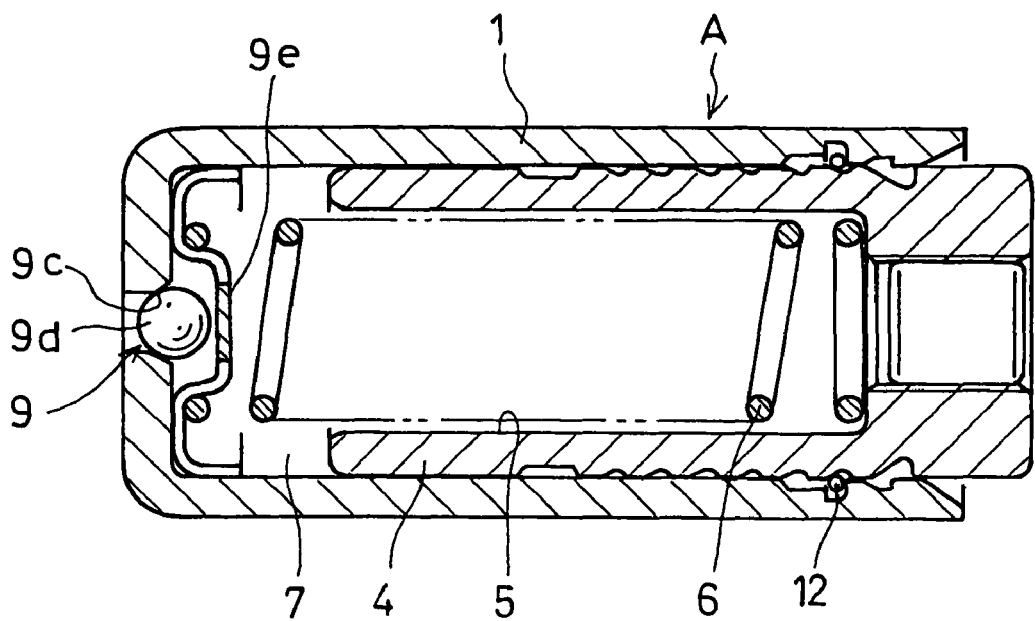
FIG. 4 is a vertical sectional front view showing a second embodiment of the chain tensioner according to this invention.

FIG. 4 shows the second embodiment of the chain tensioner A according to this invention. The chain tensioner A shown in this embodiment differs from the chain tensioner A shown in the first embodiment in that the valve seat 9c forming the check valve 9 for preventing reverse flow of hydraulic oil is integrally formed with the housing 1.

Thus, to the same parts as in the chain tensioner A of the first embodiment, the same numerals are attached and their description is omitted.

As described above, by forming the valve seat 9c integral with the housing 1, it is possible to omit the seat member 9a shown in FIG. 1A. It is thus possible to further lower the manufacturing cost of the chain tensioner A having the check valve 9.

Here, in order to prevent wear of the valve seat 9c due to contact with the check ball 9d of the check valve 9, hardening treatment may be provided on the inner peripheral surface of the housing 1 including the valve seat 9c.

Figure 5:
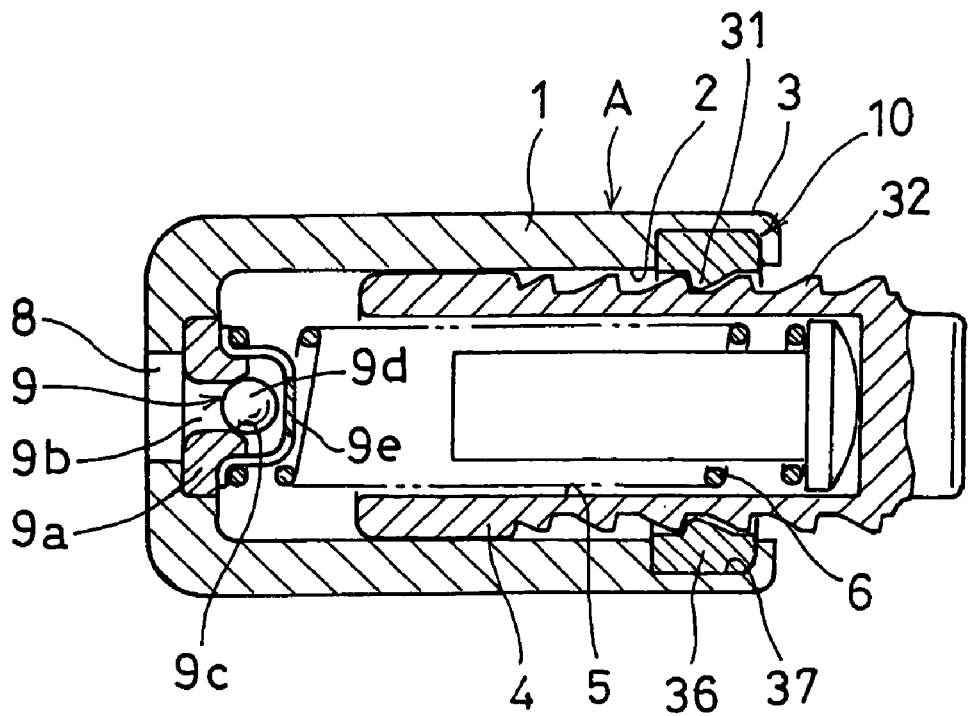
FIG. 5 is a vertical sectional front view showing a third embodiment of the chain tensioner according to this invention.
Figure 6:
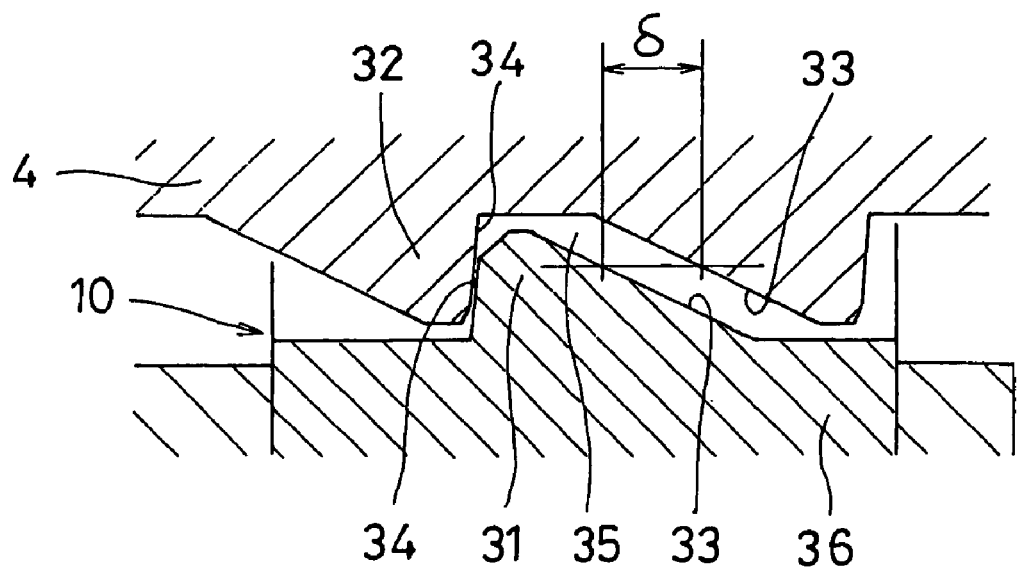
FIG. 6 is an enlarged sectional view showing a thread engagement portion between the female threads and male threads of the chain tensioner shown in FIG. 5.

FIGS. 5 and 6 show the third embodiment of the chain tensioner according to this invention. The chain tensioner A shown in this embodiment and the chain tensioner A of the first embodiment, which has already been described with reference to FIGS. 1A and 1B, differ from each other in the structure of the retraction restricting mechanism 10 for restricting retraction of the plunger 4.

Thus, to the same parts as those in the first embodiment, the same numerals are attached and their description is omitted.

In the retraction restricting mechanism 10 shown in FIGS. 5 and 6, female threads 31 are formed on the inner periphery of the opening of the cylinder chamber 2, and male threads 32 that threadedly engage the female threads 31 are formed on the outer periphery of the plunger 4 so that they have such a serration shape that the flank angle of their pressure flanks, which receive the axial push-in force applied to the plunger 3 is greater than the flank angle of the clearance flanks 34 thereof and thread gaps 35 are provided between the thread engagement portions of the serration-shaped threads. Further, the serration-shaped threads have a lead angle so that the plunger 4 can move axially while turning under the force of the spring 6.

In forming the female threads 31, here, a nut member 36 having female threads 31 on the inner periphery thereof is received in a recess 37 formed in the inner periphery of the opening of the cylinder chamber 2, and the opening end of the housing 1 is caulked inwardly to fix the nut member 36. But the female threads 31 may be formed directly on the inner periphery of the opening end of the cylinder chamber 2.

In the retraction restricting mechanism 10 having such a structure, retraction of the plunger 4 is allowed in the amount δ of the thread gaps 35 formed between the female threads 31 and the male threads 32, and the retraction of the plunger 4 is restricted by the abutment of the pressure flanks 33 of the female threads 31 and male threads 32 so that the plunger 4 will not be pushed in any further.

In the chain tensioner shown in FIG. 5, the check valve 9 having the seat member 9a is shown. But like the chain tensioner shown in FIG. 4, the valve seat 9c may be simultaneously formed when forming the housing 1 by pressing.

Figure 7:
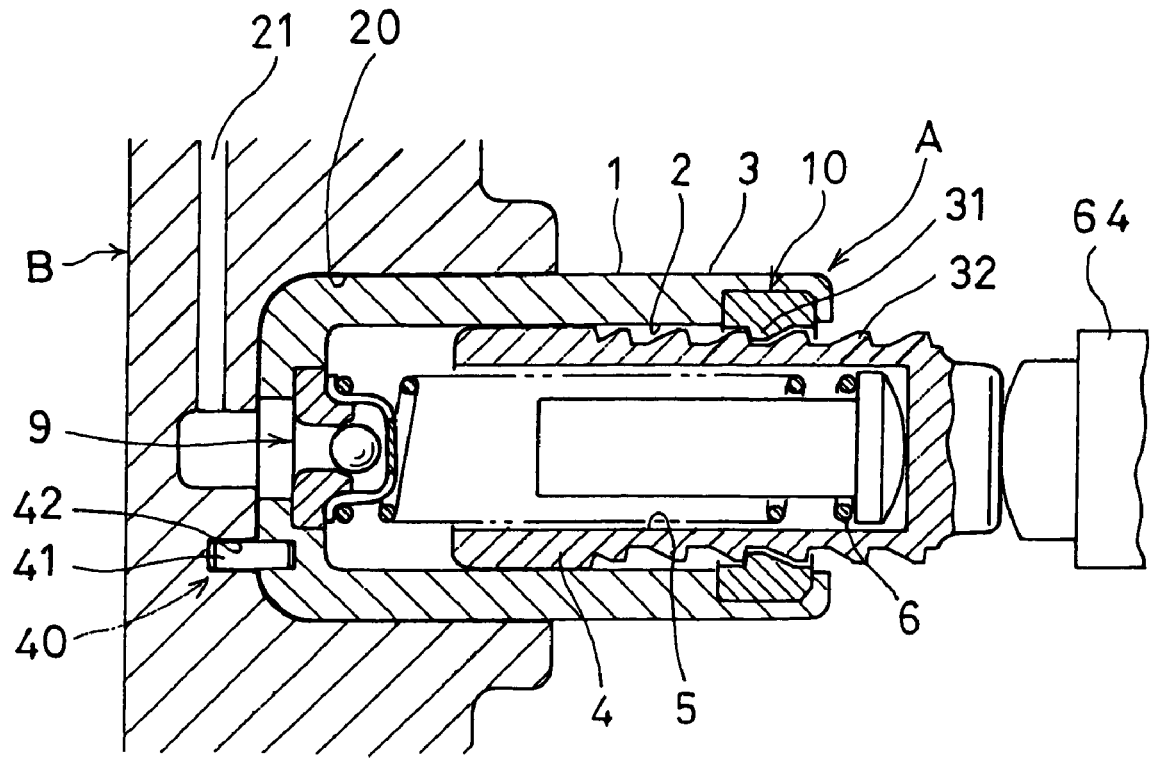
FIG. 7 is a longitudinal sectional front view showing how the chain tensioner shown in FIG. 5 is mounted.

FIG. 7 shows how the chain tensioner shown in FIG. 5 is mounted to a mounting object B. Here, like the tensioner mounting object B shown in FIG. 3, the tensioner mounting object B has a mounting hole 20 and an oil passage 21, and the housing of the chain tensioner A is inserted in the mounting hole 20.

Here, in the chain tensioner A shown in FIG. 5, since due to the elastic force of the spring 6, the plunger 4 moves axially (outwardly) while rotating to absorb slacking of the chain, if the housing 1 rotates, it is impossible to axially move the plunger 4.

Here, in the mounting example shown in FIG. 7, a turn-preventive mechanism 40 is provided between the housing 1 and the mounting hole 20. The turn-preventive mechanism 40 has a turn-preventive pin 41 protruding from the outer periphery of the rear end face of the housing 1, and inserted in a pin hole 42 formed in the closed end of the mounting hole 20 to prevent the housing 1 from turning.

As described above, by providing the turn-preventive mechanism 40 for preventing the housing 1 from turning, when the plunger 4 moves axially while turning, it is possible to prevent the housing 1 from turning together with the plunger 4, so that the chain tensioner A exhibits its functions reliably. Also, by preventing the housing 1 from turning, it is possible to suppress wear on the contact surfaces of the housing 1 and the mounting hole 20.

As shown in FIGS. 3 and 7, with the mounting method of the chain tensioner A in which the housing 1 is inserted in the mounting hole 20, the chain tensioner A may move in such a direction as to come out due to the pressure of hydraulic oil supplied into the oil passage 21. Also, while moving, it contacts the inner periphery of the mounting hole, so that the outer periphery of the housing 1 tends to be worn. The inner-diameter surface of the cylinder chamber 2 also tends to be worn due to sliding of the plunger 4.

Therefore, in the chain tensioners of the first to third embodiments, the outer periphery of the housing 1 and the inner wall of the cylinder chamber 2 are subjected to hardening to increase hardness to about Hv 400-700. For hardening, treatment such as carburizing/nitriding or plating may be employed. By increasing the hardness of the outer peripheral surface of the housing 1 by such hardening treatment, it is possible to prevent the housing from getting worn by contact with the inner periphery of the mounting hole 20. Thus it is possible to provide a housing 1 that is superior in durability.

Figure 8:
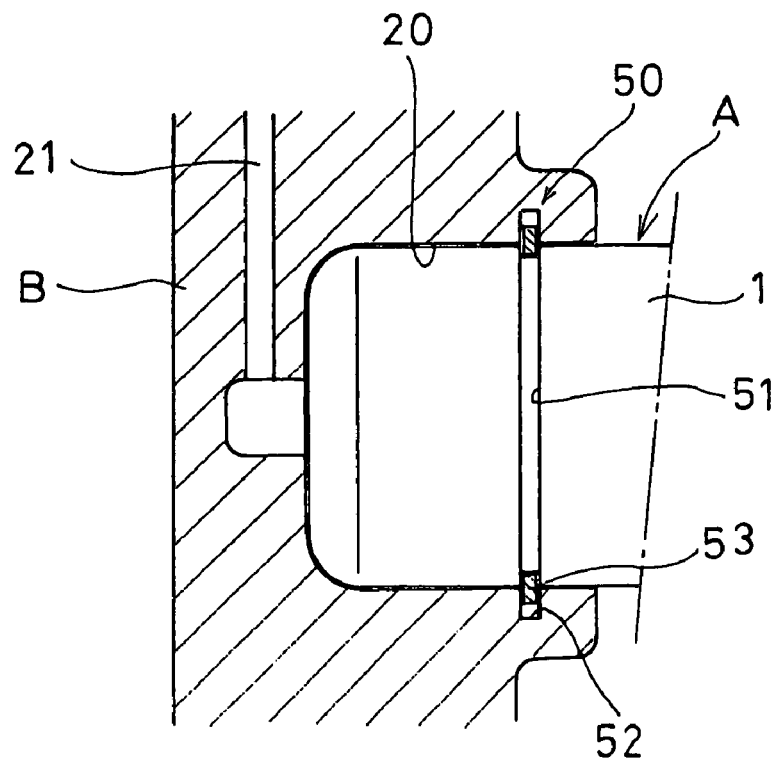
FIG. 8 is a sectional view showing another example of mounting of the chain tensioner according to this invention.

FIG. 8 shows another example of mounting of the chain tensioner A of any of the first to third embodiments. In this example, a mounting hole 20 is formed in a tensioner mounting object B comprising an engine cover, the chain tensioner A is inserted in the mounting hole 20, and a fall-preventive mechanism 50 is provided between the housing 1 of the chain tensioner A and the mounting hole 20.

The fall-preventive mechanism 50 has a snap ring 53 mounted in a groove 51 formed in the outer periphery of the housing 1 and a groove 52 formed in the inner periphery of the mounting hole 20.

As described above, by preventing the housing 1 from coming out by the fall-preventive mechanism 50, it is possible to stabilize the mounting of the chain tensioner A, and to omit hardening applied to the housing. Thus, compared with chain tensioners A which are subjected to hardening, it is possible to reduce the cost.

Figure 9:
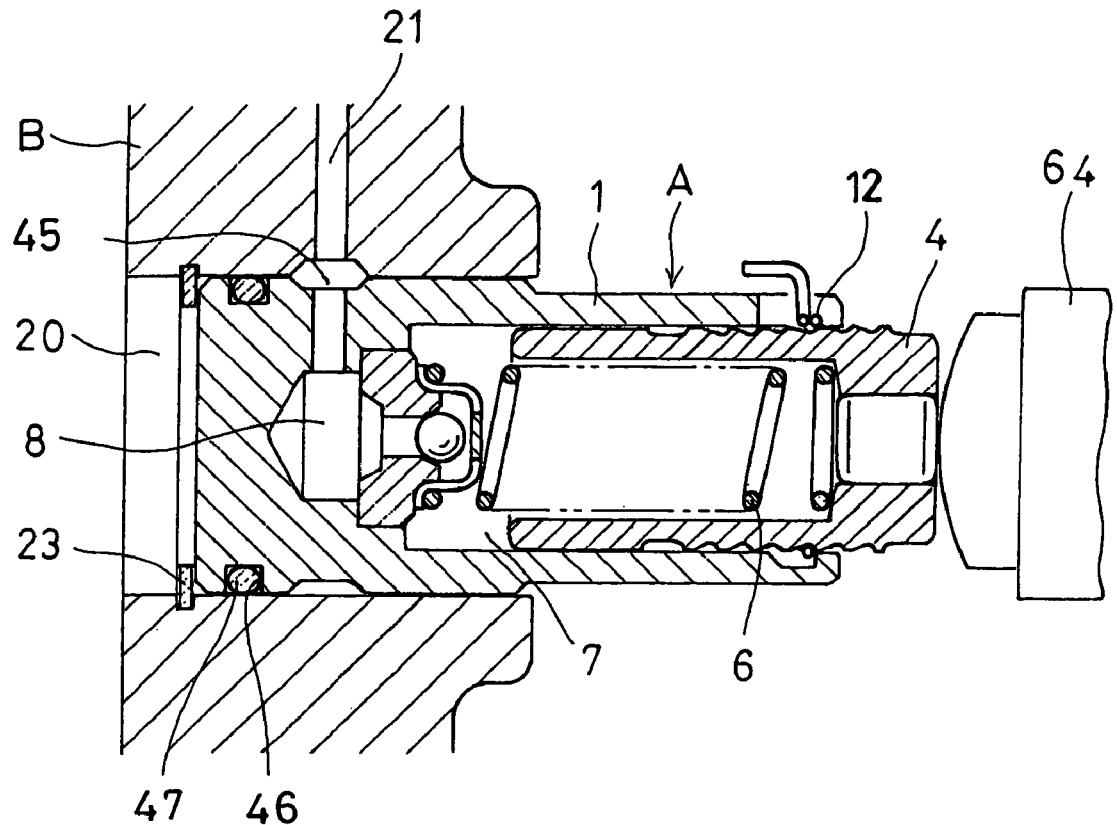
FIG. 9 is a longitudinal sectional front view showing a fourth embodiment of the chain tensioner according to this invention.

FIG. 9 shows the fourth embodiment of the chain tensioner according to this invention. The chain tensioner shown in this embodiment differs from the chain tensioner of the first embodiment shown in FIG. 1 in that the outer diameter of the housing at its rear end is slightly greater than the outer diameter at its front end, an annular groove 45 and a seal groove 46 are formed in its rear end, an oil supply passage 8 communicating with the pressure chamber 7 is formed in the bottom of the annular groove 45, and an O-ring 47 is received in the seal groove 46.

In order to mount the chain tensioner A having this structure to e.g. a tensioner mounting object B comprising an engine cover, a mounting hole 20 comprising a through hole is formed in the tensioner mounting object B, the chain tensioner A is inserted in the mounting hole 20 to press the O-ring 47 against the inner peripheral surface of the mounting hole 20, the amount of insertion of the chain tensioner A is restricted by a snap ring 23 mounted on the inner periphery of the mounting hole 20, and an oil passage 21 communicating with the annular groove 45 is formed in the tensioner mounting object B.

In FIG. 9, by opening the oil supply passage 8 to the bottom of the annular groove 45 formed in the outer periphery of the housing 1 at its rear end and supplying hydraulic oil into the oil supply passage 8 through the oil passage 21 formed in the tensioner-mounting object B, it is possible to prevent the housing 1 from moving in such a direction as to come out under the pressure of hydraulic oil. This allows stable mounting of the housing 1.

Also, since the outer diameter of the housing is substantially uniform over the entire axial length, the housing 1 can be formed by pressing.

Further, by making the inner diameter of the mounting hole 20, which is a through hole, greater than the maximum diameter of the chain tensioner so that the latter can be inserted from the outer side of the object B (e.g. from the outer side of an engine cover), it is possible to make the mounting easy.

Figure 10:
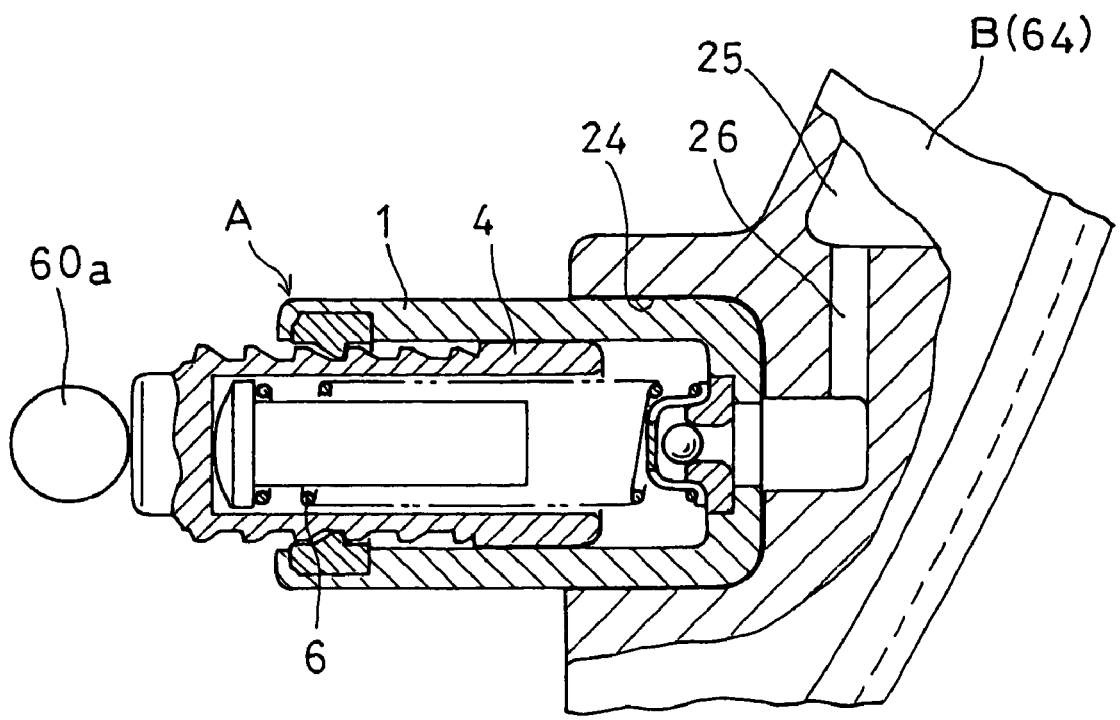
FIG. 10 is a sectional front view showing a further example of mounting of the chain tensioner according to this invention.

FIG. 10 shows an example in which, with the chain guide 64 shown in FIG. 14 as the tensioner mounting object B, the chain tensioner is mounted to this tensioner mounting object B.

The chain tensioner mounting object B is formed with a mounting hole 24, a reservoir chamber 25 and an oil passage 26 through which the reservoir chamber 25 and the mounting hole 24 communicate. The housing 1 of the chain tensioner A is inserted in the mounting hole 24, and the tip of the plunger 4 of the chain tensioner A is brought into abutment with an abutment 60a provided on an engine cover (not shown) to bias the chain guide 64 in such a direction that the chain is stretched by the resilience of the spring 6.

Figure 11:
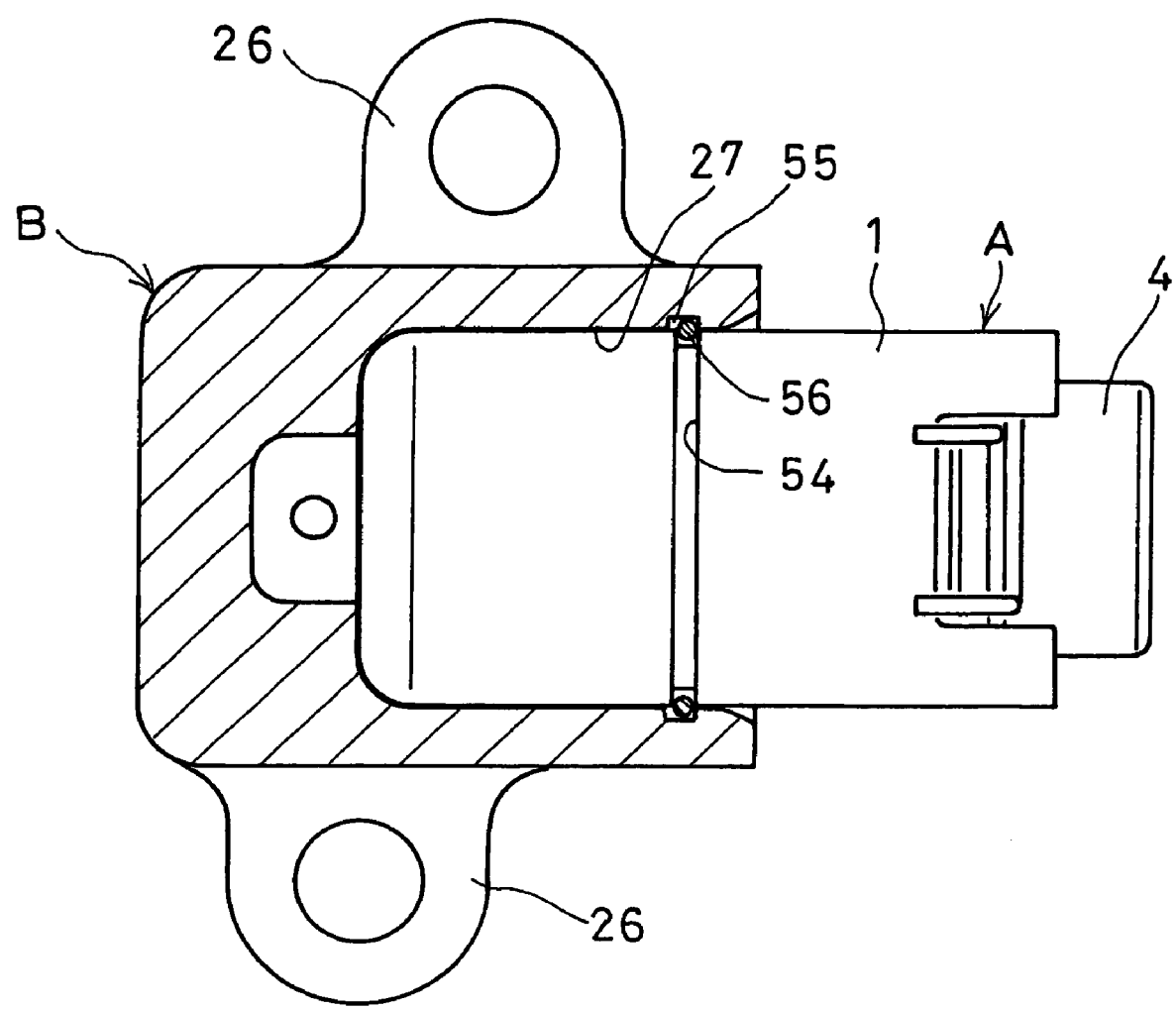
FIG. 11 is a sectional view showing still another example of mounting of the chain tensioner according to this invention.
Figure 12:
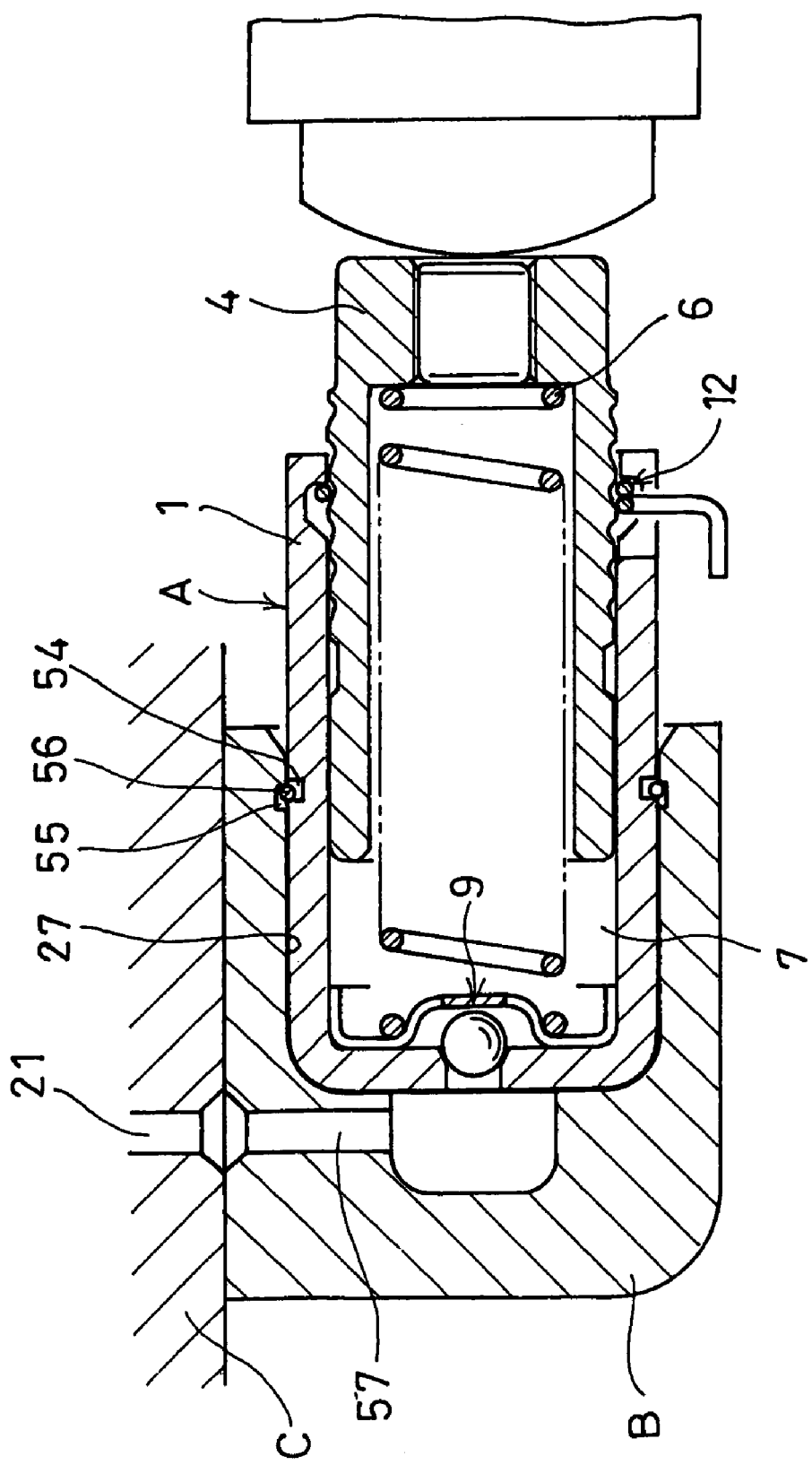
FIG. 12 is a longitudinal sectional front view of FIG. 11.

FIGS. 11 and 12 shows another example of the tensioner mounting object B to which the chain guide A is mounted. In this example, a holder B mounted on an engine block C is the tensioner mounting object. A mounting hole 27 is formed in the holder B, the chain tensioner A is inserted in the mounting hole 27, and a snap ring 56 is mounted so as to straddle an engaging groove 54 formed in the outer periphery of the housing 1 of the chain tensioner A, and an engaging groove 55 formed in the inner periphery of the mounting hole 27 to prevent the housing 1 from coming out. 57 shows a passage through which an oil passage 21 formed in the engine block C communicates with the oil supply passage 21 formed in the housing 1.

As shown in FIGS. 11 and 12, by using the holder B mounted on the engine block C as the tensioner mounting object, even if the kind of engine to which the chain tensioner A is to be mounted varies, it is not necessary to change the size, shape, etc. of the housing 1, so that it can be manufactured with identical size and shape. Thus, it is possible to lower the cost of the chain tensioner.

While it is necessary to change the size of the holder B according to the kind of engine, since its shape is simple and no precision is required, it can be manufactured at a low cost by forging such as die casting.

The retraction restricting mechanism is not limited to the ones of the embodiments, but may be of the ratchet type or any other type.

EFFECT OF THE INVENTION

As described above, according to this invention, since the outer diameter of the housing, in which is received the plunger and the spring, is substantially constant over the entire axial length, such housings can be mass-produced by pressing. Thus, it is possible to lower the cost of the chain tensioner.

The invention claimed is:

1. A chain tensioner arrangement comprising an engine cover having a cylindrical mounting hole having a bottom and formed with an oil passage that opens to said bottom of said cylindrical mounting hole, a cylindrical housing having an axis and formed with a cylinder chamber, said housing having a bottom at a rear end thereof, a plunger slidably mounted in said cylinder chamber, a spring mounted in said cylinder chamber for biasing said plunger outwardly, said housing having, in said bottom thereof, an oil supply passage communicating with a pressure chamber formed at the back of said plunger, said axis of said housing extending through said oil supply passage, whereby a push-in force imparted to said plunger can be damped by hydraulic oil supplied to said pressure chamber through said oil supply passage, wherein said housing and has a substantially uniform outer diameter over the entire axial length of said housing, and wherein said rear end of said housing is inserted in said cylindrical mounting hole of said engine cover, such that said oil supply passage communicates with said oil passage.

2. A chain tensioner arrangement as claimed in claim 1 wherein at an oil outlet side of said oil supply passage, a check valve having a valve seat and a check ball provided so as to come into and out of contact with the valve seat to close the oil supply passage is provided.

3. A chain tensioner arrangement as claimed in claim 2 wherein said valve seat is formed integral with the housing.

4. A chain tensioner arrangement as claimed in claim 2 further comprising a retraction restricting mechanism provided between said housing and said plunger and configured to prevent said plunger from retracting over a predetermined amount toward the bottom of said cylinder chamber.

5. A chain tensioner arrangement as claimed in claim 3 further comprising a retraction restricting mechanism provided between said housing and said plunger and configured to prevent said plunger from retracting over a predetermined amount toward the bottom of said cylinder chamber.

6. A chain tensioner arrangement as claimed in claim 1 further comprising a retraction restricting mechanism provided between said housing and said plunger and configured to prevent said plunger from retracting over a predetermined amount toward the bottom of said cylinder chamber.

7. A chain tensioner arrangement as claimed in claim 6 wherein said refraction restricting mechanism comprises a clip-receiving groove formed in the inner periphery of said cylinder chamber near its opening, a diametrically deformable register clip being received in said clip-receiving groove, said plunger being formed with a plurality of circumferential grooves in the outer periphery thereof at axial intervals, and each of said circumferential grooves having a tapered surface for expanding said ring portion when said plunger is advancing and an engaging surface which engages said ring portion to prevent retraction of said plunger.

8. A chain tensioner arrangement as claimed in claim 6 wherein said refraction restricting mechanism comprises female threads formed on the inner periphery of said cylinder chamber at its opening end, and male threads formed on the outer periphery of said plunger and in threaded engagement with said female threads, said female threads and male threads being serration-shaped such that pressure flanks thereof, which receive axial push-in force imparted to the plunger, have a greater flank angle than clearance flanks thereof, said serration-shaped threads having such a lead angle that the plunger moves outwardly under the elastic force of the spring.

9. A chain tensioner arrangement as claimed in claim 1 wherein the outer peripheral surface of said housing is a hardened outer peripheral surface.

10. A chain tensioner arrangement as claimed in claim 1, wherein said cylindrical mounting hole has a rear wall, and said rear end of said housing seats against said rear wall of said cylindrical mounting hole.

11. A chain tensioner arrangement as claimed in claim 10, wherein said rear wall of said cylindrical mounting hole is part of said engine cover.

12. A chain tensioner arrangement as claimed in claim 1, further comprising a retraction restricting mechanism provided between said housing and said plunger and configured to prevent said plunger from retracting over a predetermined amount toward the bottom of said cylinder chamber, said retraction restricting mechanism comprising female threads formed on the inner periphery of said cylinder chamber at its opening end, and male threads formed on the outer periphery of said plunger and in threaded engagement with said female threads; and
a turn-preventive mechanism configured to prevent turning of said housing within said cylindrical mounting hole of said engine cover.

13. A chain tensioner arrangement as claimed in claim 12, wherein said female threads formed on the inner periphery of said cylinder chamber and said male threads formed on the outer periphery of said plunger are serration-shaped such that pressure flanks thereof, which receive axial push-in force imparted to the plunger, have a greater flank angle than clearance flanks thereof, said serration-shaped threads having such a lead angle that the plunger moves outwardly under the elastic force of the spring.

14. A chain tensioner arrangement as claimed in claim 13, wherein said turn-preventive mechanism comprises a turn-preventive pin engaged with each of said housing and said engine cover.

15. A chain tensioner arrangement as claimed in claim 1, further comprising a fall-preventive mechanism configured to prevent said housing from falling out of said cylindrical mounting hole of said engine cover.

16. A chain tensioner arrangement as claimed in claim 15 further comprising a retraction restricting mechanism provided between said housing and said plunger and configured to prevent said plunger from retracting over a predetermined amount toward the bottom of said cylinder chamber.

17. A chain tensioner arrangement as claimed in claim 15, wherein said fall preventive mechanism comprises a snap ring mounted in a groove formed in an outer periphery of said housing and a groove formed in an inner periphery of said mounting hole.

18. A chain tensioner arrangement as claimed in claim 1 wherein said housing is a pressed member having a wall thickness of 1.7 to 2.5 mm.

* * * * *